(12) United States Patent
Lee

(10) Patent No.: US 6,705,350 B2
(45) Date of Patent: Mar. 16, 2004

(54) PLUG AND PLUGGING MACHINE FOR PIPELINE FITTING

(76) Inventor: Woo Kag Lee, 101 Dong 601 Ho, Chungsol Woosung Apartment. 80, Dapsipri Dong, Dongdaemoon-Ku, Seoul (KR)

( * ) Notice: Subject to any disclaimer, the term of this patent is extended or adjusted under 35 U.S.C. 154(b) by 255 days.

(21) Appl. No.: 10/011,874

(22) Filed: Nov. 5, 2001

(65) Prior Publication Data

US 2003/0037830 A1 Feb. 27, 2003

(30) Foreign Application Priority Data

Aug. 24, 2001 (KR) .................................... 2001-0051338

(51) Int. Cl.[7] ............................................... F16L 55/10
(52) U.S. Cl. ..................... 138/92; 138/94; 138/96 R; 220/315; 220/323
(58) Field of Search ............................. 138/92, 89, 90, 138/94, 96 R; 220/315, 323

(56) References Cited

U.S. PATENT DOCUMENTS

| | | | |
|---|---|---|---|
| 4,058,142 A | | 11/1977 | Rankin |
| 4,387,740 A | * | 6/1983 | Vanzant ........................ 138/89 |
| 4,609,209 A | | 9/1986 | Ralls |
| 4,693,278 A | * | 9/1987 | Wilson et al. ................. 138/89 |
| 5,450,765 A | * | 9/1995 | Stover ........................ 73/866.5 |
| 6,286,553 B1 | * | 9/2001 | Morgan ........................ 138/89 |

* cited by examiner

Primary Examiner—James Hook
(74) Attorney, Agent, or Firm—R W Becker & Associates; R W Becker

(57) ABSTRACT

A plug for a pipeline fitting is provided and includes a cylindrical body having an annular sealing groove, an O-ring fitted in the annular sealing groove, an expanding plate having an outer edge inserted into an annular locking groove of the pipeline fitting, and an expanding device connected to a plugging machine to insert the expanding plate into the locking groove of the fitting. The expanding plate is divided into two half plates and has a central opening with a minor axis in the direction of expansion and a major axis perpendicular to the expansion direction. The expanding plate has elongated holes and pins formed at positions symmetrical with respect to the dividing line of the expanding plate. The cylindrical body has threaded holes formed at positions corresponding to the elongated holes of the expanding plate. Screws are screwed into the threaded holes through the elongated holes to couple the expanding plate to the cylindrical body. The cylindrical body has a central circular recess. The expanding device includes a lower disc inserted into the circular recess of the cylindrical body, an upper disc having a pair of curved elongated holes engaged with the pins of the expanding plate to move the pins outwardly, an annular groove formed between the upper and lower discs, and a connecting portion to be connected to the plugging machine.

2 Claims, 6 Drawing Sheets

PLUG AND PLUGGING MACHINE FOR PIPELINE FITTING

BACKGROUND OF THE INVENTION

1. Field of the Invention

The present invention relates to a pipeline fitting such as a branch pipeline fitting for connecting a main pipeline into which liquid such as gas flows to a branch pipeline for transfer of the gas in the main pipeline to a site which requires the gas, and, more particularly, to a plug and a plugging machine for a pipe fitting which are intended to prevent leakage of gas after a branching operation for a pipeline, repairing operation for a pipeline, or the like is completed.

2. Description of the Prior Art

Nowadays, processed gas is used predominantly in most dwellings, buildings, and the like as heating fuel. Hence, many gas pipes are built underground in all cities and towns in a "net" fashion, which transfer processed gas from a gas processing plant to the specific sites.

Such gas fuel is transferred to sites through branch pipeline fittings which are adapted to connect a main pipeline connected to a gas manufacturing plant and to branch pipelines connected to the specific site.

To supply gas fuel from a main pipeline to sites such as dwellings or buildings, branch pipelines are first laid underground, and then are connected to the main pipeline by mounting branch pipeline fittings therebetween.

This type of operation for connecting a main pipeline and a branch pipeline by means of a branch pipeline fitting while gas flows through the main pipeline is carried out as follows:

(1) A lower end of a branch pipeline fitting is welded to an outer surface of a main pipeline while being in contact therewith, and then the branch pipeline fitting is welded to a branch pipeline which is laid underground in advance.

(2) A tapping valve is attached to an upper end of the branch pipeline fitting. A perforation machine is attached to an upper end of the tapping valve. After the tapping valve is opened, a tapping unit of the perforation machine is downwardly moved to the main pipeline. The main pipeline is perforated by rotating the tapping unit of the perforation machine.

(3) After the tapping unit of the perforation machine and the cut portion of the main pipeline are raised into the perforation machine, the tapping valve is closed. Thereafter, the perforation machine is removed from the tapping valve.

(4) A plugging machine for mounting a plug is attached to the tapping valve so as to prevent leakage of gas. The tapping valve is then removed and a closing plate is connected to the upper end of the branch pipeline fitting.

In this way, the branch pipeline is safely connected to the main pipeline while gas flows through the pipeline.

When a pipeline needs to be repaired, the pipeline is closed at its upstream. Such an operation of closing a pipeline will now be described with reference to FIGS. 1 and 2.

(1) A pipeline fitting 2 is welded at its lower end to a pipeline 1, and a tapping valve 3 is attached to the pipeline fitting 2.

(2) After a perforation machine is mounted on the tapping valve 3, the tapping valve is opened. A tapping unit of the perforation machine is downwardly moved to the pipeline, and then rotated to form an opening in the pipeline.

(3) A tapping unit of a perforation machine and a cut portion of the pipeline 1 are raised into the perforation machine. Thereafter, the tapping valve 3 is closed, and the perforation machine is then removed from the tapping valve.

(4) A plugging machine is attached to the tapping valve, and a temporary plug is then provided in the pipeline through the perforated opening of the pipeline 1 to block the downstream flow of gas. Then, the downstream portion of the pipeline 1 is repaired, and the temporary plug is removed from the pipeline 1.

(5) A plug 4 is loaded into the plugging machine and then locked into the pipeline fitting 2 to prevent leakage of gas. The tapping valve 3 is removed, and a closing plate 5 is mounted on the pipeline fitting 2.

As described above, after the downstream portion of the pipeline is repaired while gas flows in an upstream section of the pipeline, gas leakage from the pipeline can be reliably prevented.

An example of a plug, which is adapted to be locked to a pipeline in order to prevent gas leakage from the pipeline after a branching operation or a repair operation of the pipeline, is disclosed in U.S. Pat. No. 4,058,142.

As shown in FIG. 2, the prior art plug 4 disclosed in the patent comprises a cylindrical body 4b having an annular sealing groove 4a formed at its circumferential surface, an O-ring 4c fitted in the annular sealing groove 4a of the cylindrical body 4b, an enlarged plate 4d locked in an annular locking groove 2a formed at an inner surface of a pipeline fitting 2, and an expanding device 4e connected to a plugging machine, which is adapted to expand the plate 4d and thus cause the plate to be fitted in the annular locking groove 2a by a plugging machine.

In the prior art plug for a pipeline fitting, since the expanding device 4e is left on the plug 4 even after the plug 4 is completely locked in the pipeline fitting 2, every plug must be provided with the expanding device 4e. With such an expanding device present, production cost of the plug is thus increased and the structure of the plug becomes complicated. Furthermore, the pipeline 2 is thus increased in its height owing to the expanding device.

In addition, since the plug 4 cannot be retracted at its enlarged plate 4d once the plug is expanded and then locked in the pipeline fitting 2, the plug 4 cannot be removed from the fitting even when the pipeline is required to be repaired. Consequently, another pipeline fitting 2 must be again mounted at another portion of the pipeline and then the above-described operation must be carried out.

SUMMARY OF THE INVENTION

Accordingly, the present invention has been made keeping in mind the above problems occurring in the prior art, and an object of the present invention is to provide a plug for pipeline fitting which is provided with an expanding device adapted to be removed after the plug is locked in a pipeline fitting, thereby achieving simplification of its structure, reduction of production cost and decrease in height.

It is another object of the present invention to provide a plug for a pipeline fitting which is adapted to be removed from a pipeline fitting whenever required after being locked to the pipeline fitting.

It is a further object of the present invention to provide a plugging machine for a pipeline fitting which is used to mount the plug in a pipeline fitting and remove the plug therefrom.

In order to accomplish the above object, the present invention provides a plug for a pipeline fitting comprising: a cylindrical body having at its circumferential surface an annular groove, which is formed at its upper surface with threaded holes to be engaged with by screws, and which is centrally formed at its upper surface with a circular recess; an O-ring fitted in the annular groove of the cylindrical body; an expanding plate having a circumferential edge to be inserted into an annular groove formed at an inner surface of the pipeline fitting, which is divided into a pair of semicircular plates and provided with a central opening having a minor axis in the direction of expansion of the expanding plate and a major axis in the direction perpendicular to the expansion direction, and which is provided with a plurality of elongated holes corresponding to the screws of the cylindrical body to allow the expanding plate to be coupled to the cylindrical body by the screws, the half semicircular plates being provided with pins such that the pins are symmetrical to each other with respect to a dividing line of the expanding plate; and an expanding device for causing the outer edge of the expanding plate to be inserted into the annular groove of the pipeline fitting, which comprises a lower disc inserted into the circular recess of the cylindrical body, an upper disc having a pair of curved elongated holes into which the pins of the expanding plate are inserted and which is adapted to move the pins received therein outwardly, an annular groove formed between the upper disc and the lower disc into which the inner edges of the half expanding plates of the expanding plate are inserted, and a connecting projection to be connected to the plugging machine.

In order to accomplish the above object, the present invention also provides a plugging machine for a pipeline fitting comprising: a housing attached to a tapping valve and having a central hole; an adapter to be connected to a connecting portion of a locking device of a plug to be mounted on the pipeline fitting; an elevating pipe having a central through hole, which has a lower end to be coupled to the adapter and an upper end having a bushing screwed therein and rotating means; sealing means disposed between the elevating pipe and the central hole of the housing; one or more guide bars mounted on the housing to guide movement of the elevating pipe; means for releasably holding the elevating pipe, which is moved up and down along the guide bars; a threaded rod having the threaded portion to be engaged with the bushing of the elevating pipe, which functions to move the elevating pipe up and down; and means for rotatably holding the threaded rod, which is coupled to upper ends of the guide bars.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
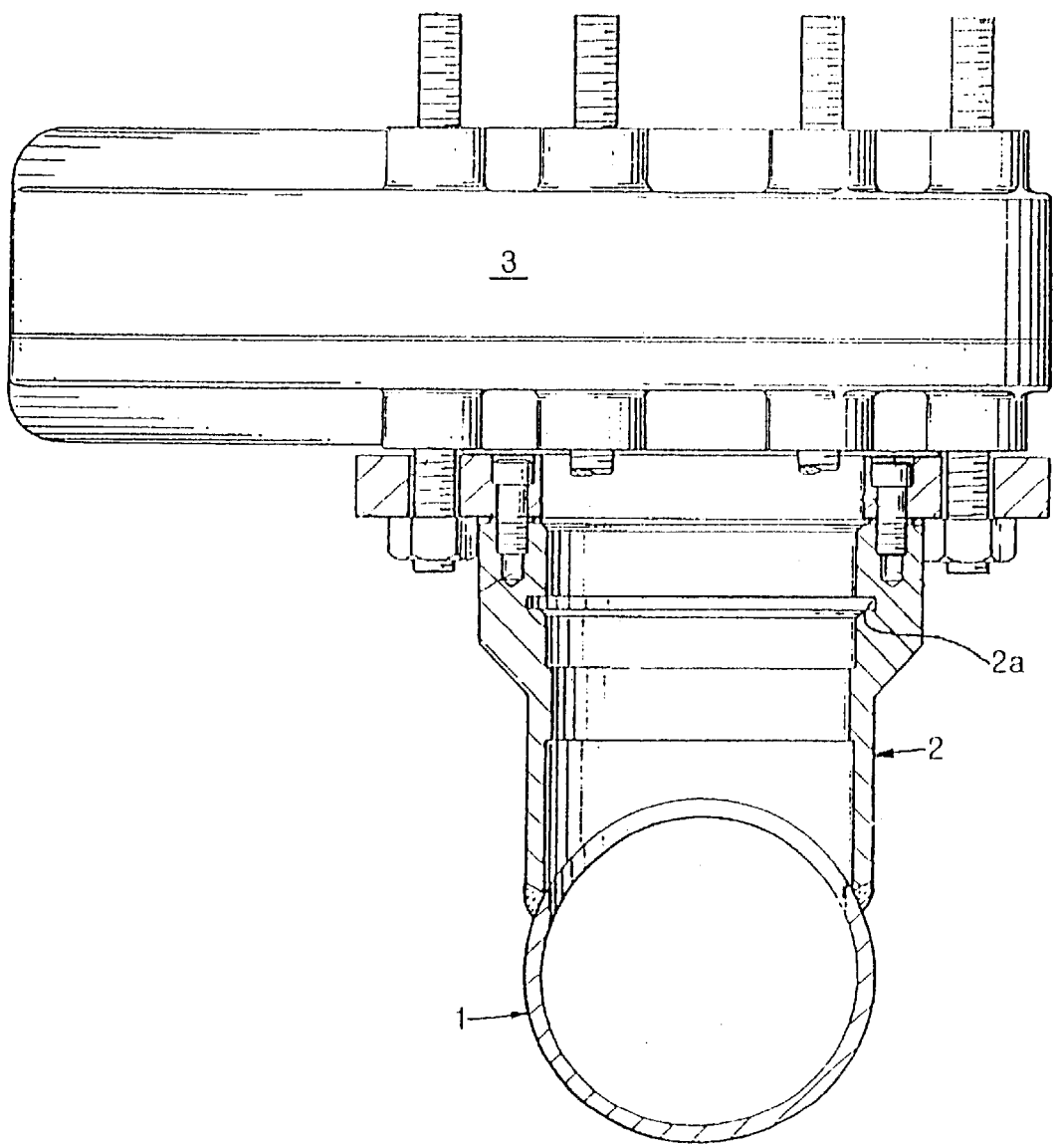
FIG. 1 is a cross-sectional view showing a prior art pipeline fitting to which a tapping valve is attached to mount a conventional plug.
Figure 2:
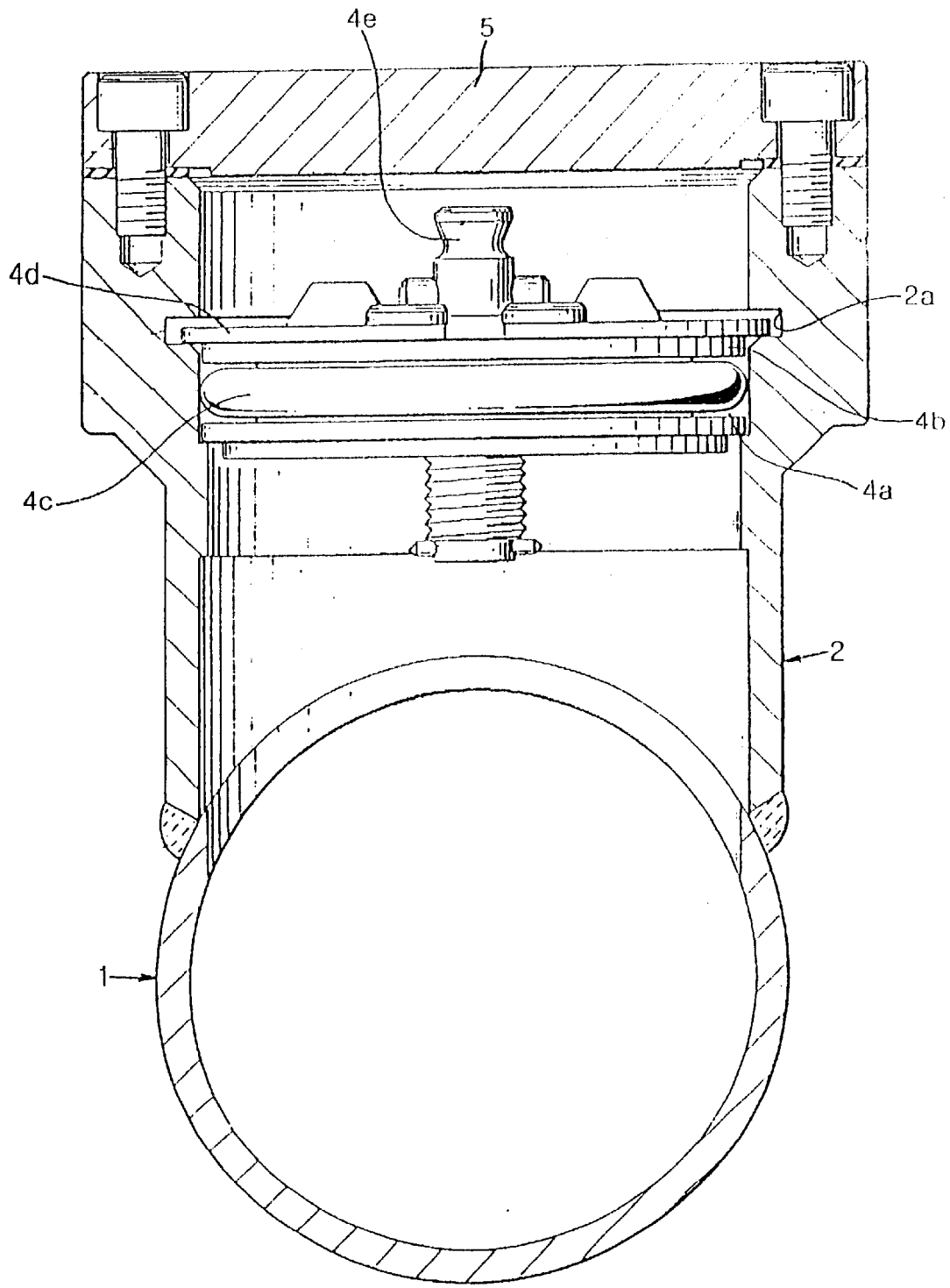
FIG. 2 is an enlarged cross-sectional view showing the pipeline fitting of FIG. 1 in which the conventional plug is mounted.

Reference now should be made to the drawings, in which the same reference numerals are used throughout the different drawings to designate the same or similar components.

Figure 3A:
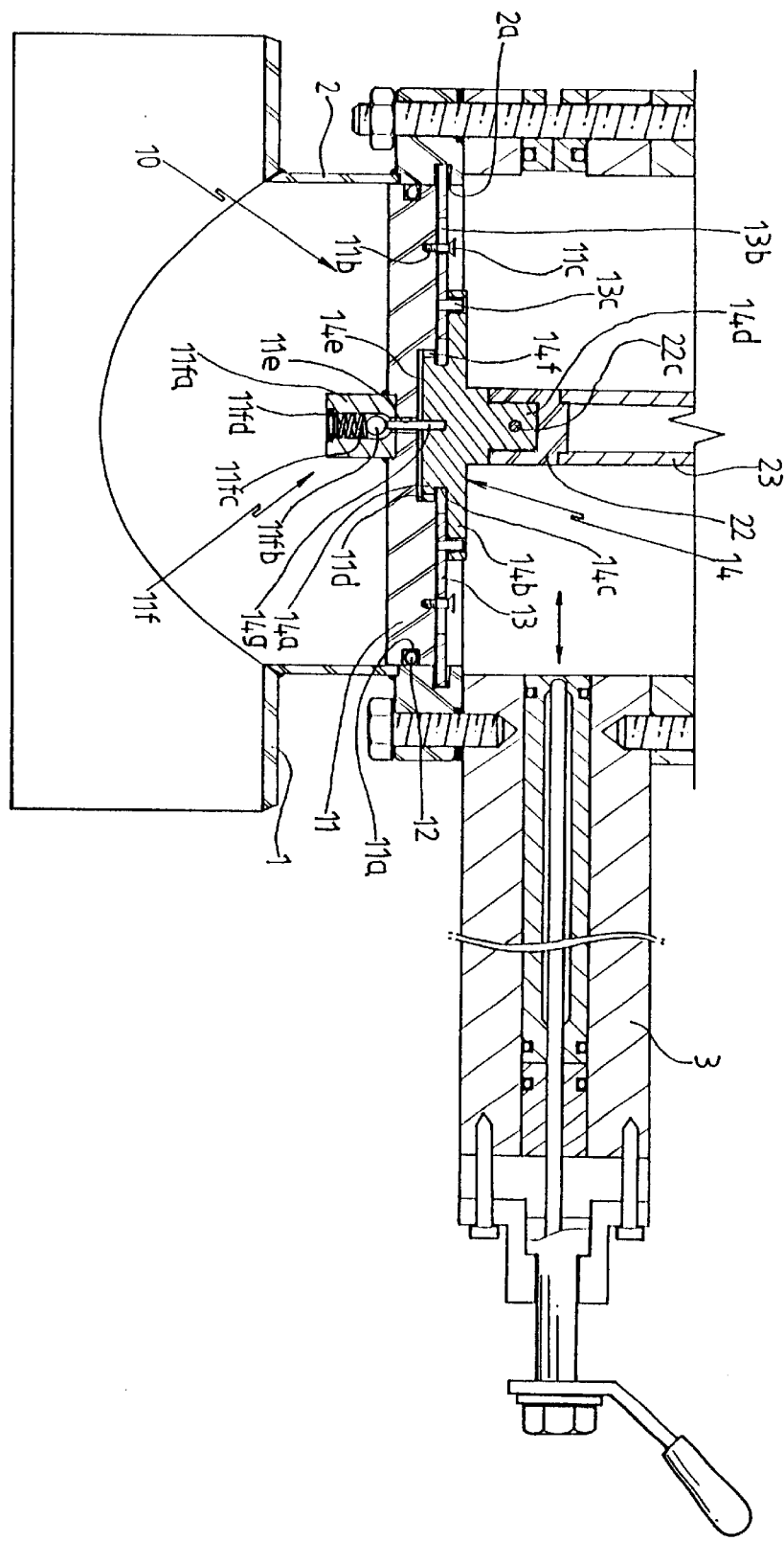
FIG. 3a is a cross-sectional view showing a plug according to the present invention, which is mounted in a pipeline fitting.
Figure 3B:
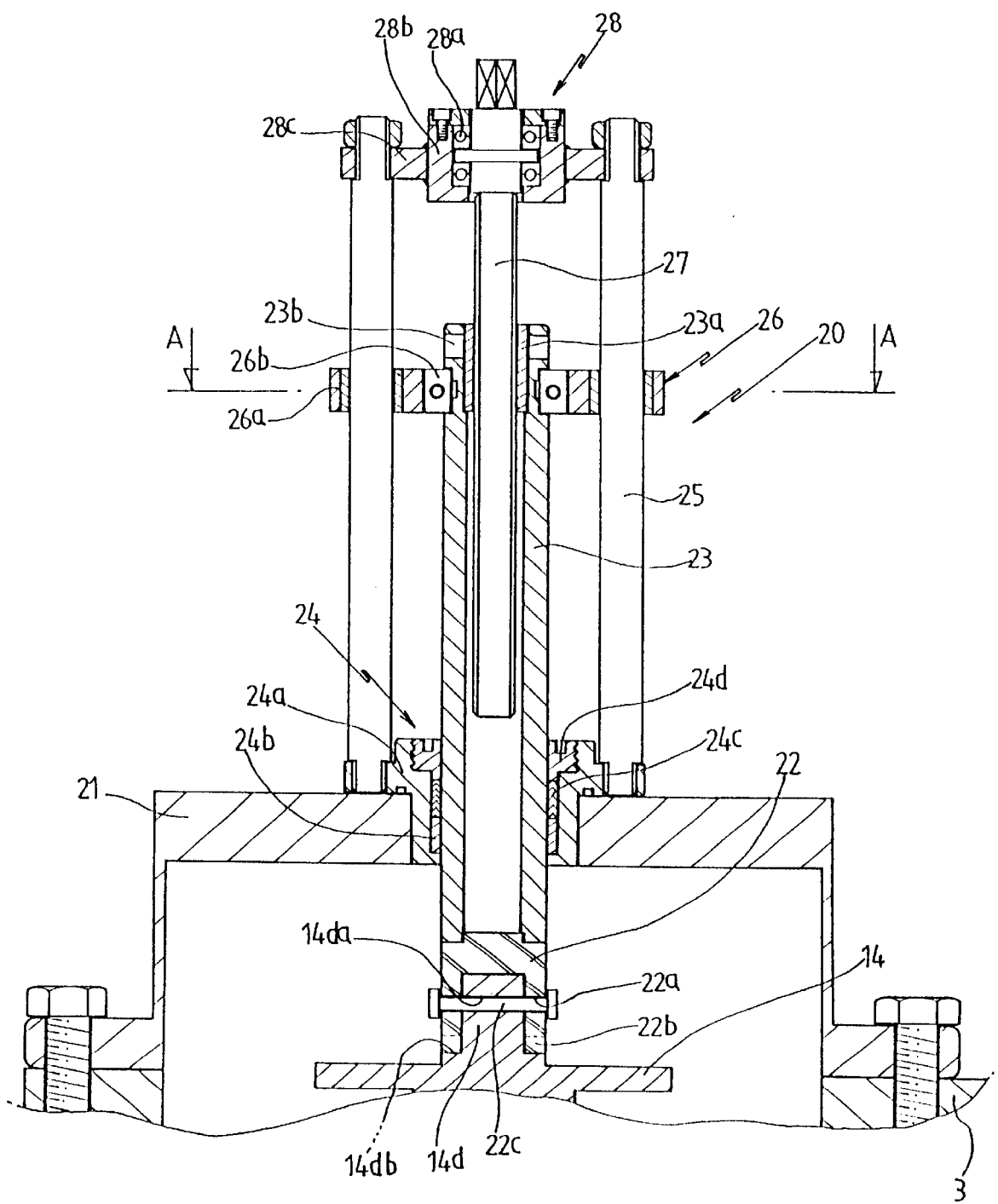
FIG. 3b is a cross-sectional view showing a plugging machine according to the invention, which is used to mount and remove the plug.
Figure 4:
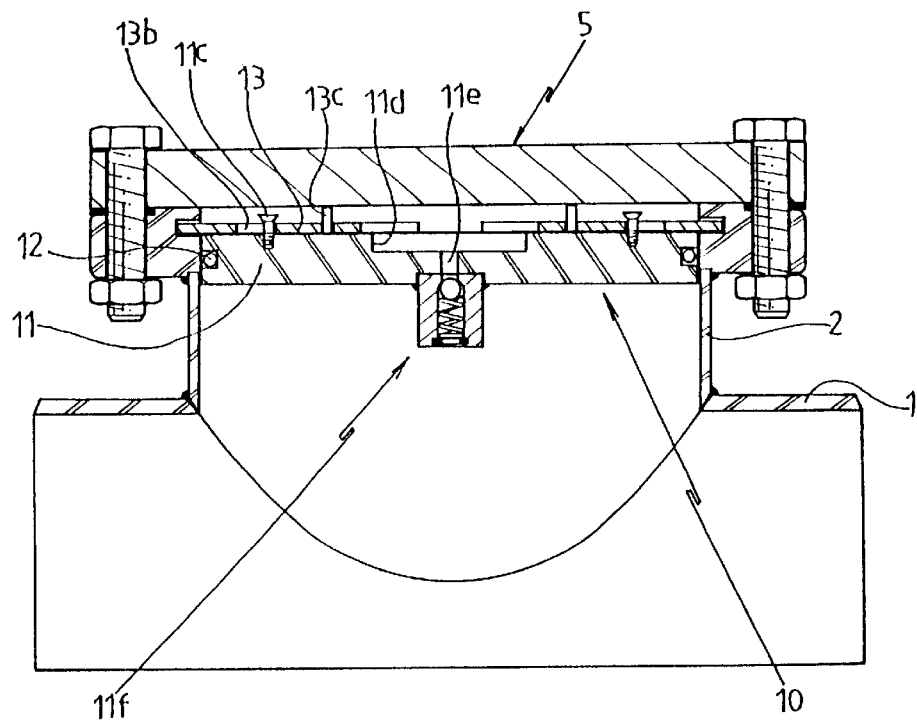
FIG. 4 is a cross-sectional view showing the plug of the invention, which is completely mounted in a pipeline fitting.
Figure 5:
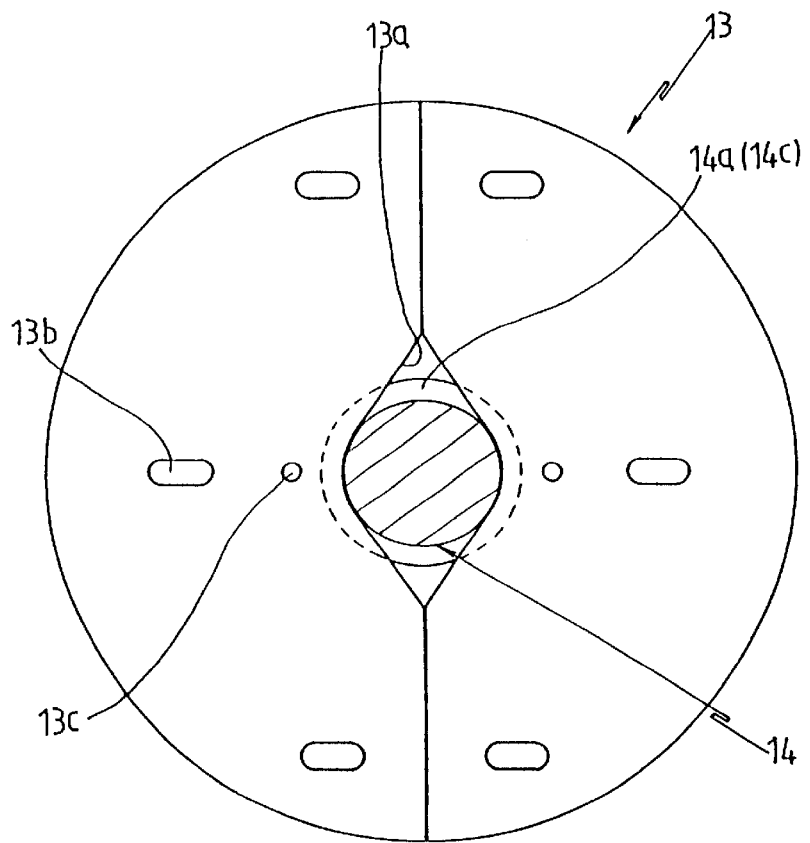
FIG. 5 is a plan view showing an expanding plate, which is a component of the plug of the invention.
Figure 6:
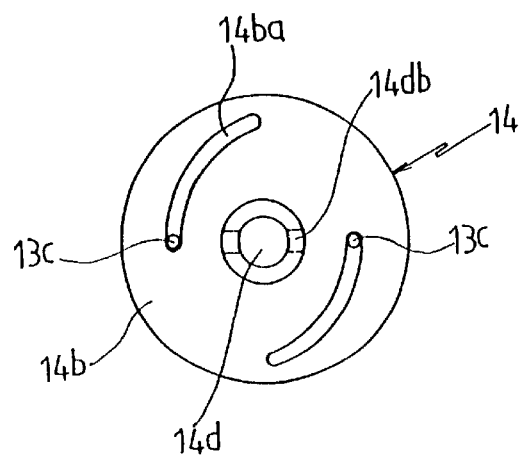
FIG. 6 is a plan view showing an expanding device, which is a component of the plug of the invention.
Figure 7:
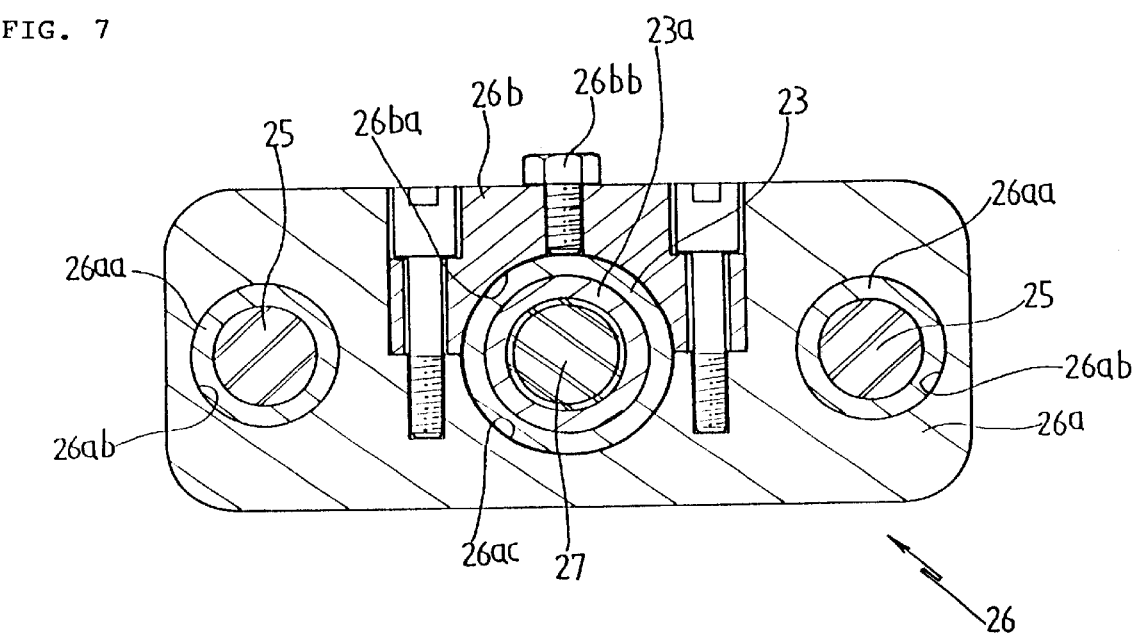
FIG. 7 is a cross-sectional view taken along the line A—A of FIG. 3b, which shows the means for holding an elevating pipe according to the invention.

FIG. 3a is a cross-sectional view showing an operation of mounting a plug according to the present invention in a pipeline fitting, FIG. 3b is a cross-sectional view showing a plugging machine according to the present invention which is used to mount and remove the plug, FIG. 4 is a cross-sectional view showing the plug which is completely mounted on a pipeline fitting, FIG. 5 is a plan view showing an expanding plate which is a component of the plug according to the invention, FIG. 6 is a plan view showing an expanding device which is a component of the plug according to the invention, and FIG. 7 is a cross-sectional view taken along the line A—A of FIG. 3b, which shows means for holding an elevating pipe which is a component of a plugging machine according to the invention.

As shown in the drawings, the plug 10 for the pipeline fitting according to the present invention comprises a cylindrical body 11 having an annular sealing groove 11a formed at its circumferential surface, an O-ring 12 fitted in the annular sealing groove 11a of the cylindrical body 11, an expanding plate 13 which is adapted to be inserted and locked at its circumferential edge into an annular locking groove 2a formed at an inner surface of pipeline fitting 2, and an expanding device 14 connected to a plugging machine 20, which is adapted to expand the expanding plate 13 causing its circumferential edge to be inserted into the annular locking groove 2a of the pipeline fitting 2.

As shown in FIG. 5, the expanding plate 13 is divided into a pair of approximately semicircular plates. The expanding plate 13 is provided at its center with a central opening 13a which has a minor axis in the direction of expansion of the plate and a major axis in the direction perpendicular to the-4× expansion direction. The expanding plate 13 is also provided with a plurality of elongated holes 13b such that the elongated holes 13b formed on one of the semicircular plates are symmetrically aligned to those formed on the other semicircular plate with respect to the dividing line of the plates. Furthermore, both the semicircular plates are provided with pins 13c such that the pins 13c are symmetrical to each other with respect to the dividing line.

The cylindrical body 11 is formed at its upper surface with threaded holes 11b formed at positions corresponding to the elongated holes 13b of the expanding plate 13. Consequently, screws 11c are screwed into the threaded +23×holes 11b through the elongated holes 13b of the expanding plate 13 so as to couple the expanding plate 13 to the cylindrical body 11. The cylindrical body 11 is centrally formed at its upper surface with a circular recess 11d.

The screws 11c remain loosened to permit the half plates of the expanding plate 13 to be freely moved before the half plates are expanded, but the screws 11c are tightened to securely join the expanding plate 13 after the half plates are expanded.

At this point, the half semicircular plates of the expanding plate 13 are capable of being moved only in a longitudinal direction of the elongated holes 13b by engagement between the elongated holes 13b and the screws 11c of the cylindrical body 11.

The expanding device 14 comprises a lower disc 14a inserted into the circular recess 11d of the cylindrical body 11, an upper larger disc 14b having a pair of curved elongated holes 14ba into which the pins 13c of the expanding plate 13 are inserted and which is adapted to move the pins 13c received therein outwardly, i.e. in the expanding direction of the expanding plates, an annular groove 14c formed between the upper disc 14a and the lower disc 14b, into which the inner edges of the half expanding plates of the expanding plate 13 are inserted, and a connecting projection 14d to be connected to the plugging machine 20.

Each of the curved elongated holes 14a is shaped such that a distance between its inner end and the central axis of the upper disc 14b is larger than that between the other end and the axis, as illustrated in FIG. 6. Therefore, as the expanding device 14 is rotated counterclockwise, pins 13c, which are initially positioned at ends of the curved elongated holes 14ba closer to the axis of the expanding plate, are progressively moved toward the other ends, i.e. in the expanding direction.

As can be seen in FIG. 5, since the inner edges of the half plates of the expanding plate 13 remain inserted in the annular groove 14c of the expanding device 14 before the expanding plate 13 is expanded, the expanding device 14 is coupled to the plug 10. On the other hand, since the inner edges of the half plates are drawn from the annular groove 14c after the expansion of the expanding plate 13 is completed as shown in FIG. 3a, the expanding device 14 can be removed from the plug 10 and then raised upwardly.

The connecting projection 14d of the expanding device 14 is provided with a horizontal through hole 14da to enable the connecting projection 14d to be connected to an adapter 22 of the plugging machine to be described later. The connecting projection 14d is also provided at its opposite sides with coupling grooves 14db, which are coupled to coupling protrusions 22b of the adapter 22, in order to transmit torque from the adapter 22 to the expanding device.

Because the plug 10 is subjected to the pressure of gas flowing in a pipeline on which the pipeline fitting 2 is mounted when the plug 10 is moved downwardly to be locked to the fitting 2, it is difficult to move the plug 10 downwardly. In particular, since the plug 10 is subjected to high pressure in case it has a large diameter, the plug 10 is required to have means for equalizing the pressure between the upper space and lower space with respect to the plug 10. However, since the plug 10 is subjected to relatively low pressure from below when the plug 10 has a smaller diameter, the above-mentioned equalizing means is not required.

To provide such means for equalizing the pressure between an upper space above the plug 10 and a lower space under the plug 10, the cylindrical body 11 is formed at its center with a venting hole 11e, and the lower disc 14a of the expanding device 14 is formed at its lower surface with a plurality of radial venting grooves 14e from the center to the circumferential edge of the lower disc 14a, and formed at its circumferential surface with a plurality of vertical venting grooves 14f each of which is connected to an outer end of the corresponding radial venting groove 14e. To open and shut the venting hole 11e, the cylindrical body 11 is provided at the center of its lower surface with a switching valve device 11f including a housing 11fa having therein a through hole divided into larger and smaller diameter holes, a ball 11fb inserted into the through hole of the housing 11fa, a compression spring 11fc inserted into the through hole of the housing 11fa to bias the ball 11fb upwardly, and a snap ring 11fd fitted in a lower end of the through hole to prevent the spring 11fc and the ball 11b from being separated from the housing 11fa. To open the switching valve device 11f, a pusher pin 14g is vertically fitted to the center of a lower surface of the expanding device 14, which is adapted to push the ball 11fb downward.

Therefore, when the expanding device 14 is coupled to the cylindrical body 11, the ball 11fb is pushed downwardly to open the venting hole 11e by the pusher pin 14g. In this condition, some of gas in the pipeline 1 flows into the central opening 13a through the through hole of the housing 11fa, the venting hole 11e of the cylindrical body 11, and the horizontal radial venting grooves 14e and the vertical venting grooves 14f of the expanding device 14. At this point, since the upper disc 14b of the expanding device 14 is in loose contact with the expanding plate 13, the gas which flows from the vertical venting grooves 14f can flow outside the plug 10 between the contact surfaces.

There is no problem of gas leakage during mounting of the plug 10 since the upper space over the plug 10 is hermetically sealed. Consequently, equalization of gas pressure is achieved between the upper space and the lower space with respect to the plug 10, thereby allowing the plug 10 to be moved downward without difficulty.

After mounting of the plug 10 is completed and the expanding device 14 is removed from the plug 10, the compressed condition of the ball 11fb, owing to the pusher pin 14g of the expanding device 14, is released so that the ball 11fb is moved upwardly by restoring force of the compression spring 11fc to close the venting hole 11e, thereby blocking the flow of gas.

The plugging machine which is typically used in an operation for mounting and removing the plug 10 to and from the pipeline fitting 2 will be described in detail hereinafter.

The plugging machine 20 is installed on the tapping valve 3 attached to the pipeline fitting 2. The plugging machine 20 functions to connect the connecting projection 14d of the expanding device 14 of the plug 10 thereto, moving the plug 10 into the pipeline fitting 2, and rotating the expanding device 14 to fit the circumferential edge of the expanding plate 13 into the annular locking groove 2a of the pipeline fitting 2.

The plugging machine 20 comprises a housing 21 attached to the tapping valve 3 and having a central hole, an adapter 22 to be connected to the connecting projection 14d of the expanding device 14 of the plug 10, an elevating pipe 23 including a central through hole, which has a lower end to be coupled to the adapter 22 and an upper end having a bushing 23a screwed therein and rotating means 23b, sealing means 24 disposed between the elevating pipe 23 and a central hole of the housing 21, guide bars 25 mounted on the housing 21 to guide movement of the elevating pipe 23, means 26 for releasably holding the elevating pipe 23, which is moved up and down along the guide bars 25, a threaded rod 27 having a threaded portion to be engaged with the bushing 23a of the elevating pipe 23, which functions to move the elevating pipe 23 up and down, and means 28 for rotatably holding the threaded rod 27, which is coupled to the upper ends of the guide bars 25.

The adapter 22 is formed with a fitting hole into which the connecting projection 14d of the expanding device 14 is inserted, and formed with through holes 22a corresponding to the horizontal through hole 14da of the connecting projection 14d. In addition, the adapter 22 has coupling protrusions 22b to be fitted into the coupling grooves 14db of the connecting projection 14d. Therefore, the expanding device 14 of the plug 10 can be coupled to the adapter 22 in such a way that the connecting projection 14d of the expanding device 14 is inserted into the fitting hole of the adapter 22 with the coupling protrusions 22b of the adapter 22 fitted in the coupling grooves 14db and a threaded pin 22c is then inserted into the through holes 22a and 14da.

Although the rotating means 23b of the elevating pipe 23 is illustrated in FIG. 3b as being a hole formed at the elevating pipe 23, a proper tool may be fitted into the hole or a handle may be initially fitted into the hole to rotate the elevating pipe 23.

The sealing means 24 comprises a supporting cylinder 24a having a central through hole therein, a lower bushing 24b internally inserted in the supporting cylinder 24a, a packing 24c internally inserted in the supporting cylinder 24a, and an upper bushing 24d screwed in the supporting cylinder 24a while compressing the packing 24c.

The sealing means 24 functions to permit the elevating pipe 23 to be rotatably moved up and down while sealing the housing 21 hermetically.

As shown in FIG. 7, the means 26 for holding the elevating pipe 23 comprises a first holding part 26a having at its both sides bushing-receiving holes 26ab in which bushings 26aa are fitted to allow the guide bars 25 to be slid therein, which has at its center a semicircular recess 26ac for receiving half of the cross sectional area of the elevating pipe 23, and a second holding part 26b coupled to the first holding part 26a by screws, which has a semicircular recess 26ba complementary to the semicircular recess 26ac of the first holding part 26a to receive the other half of the cross sectional area, and a locking screw 26bb for preventing the elevating pipe 23 from being rotated.

The locking screw 26bb is strongly tightened to the elevating pipe 23 to prevent the elevating pipe 23 from being rotated when it is required to push the plug 10 into the pipeline fitting 2 by downward movement of the elevating pipe 23. When it is intended to rotate the expanding device 14 to expand the expanding plate 13 after the plug 10 is lowered to a predetermined position in the pipeline fitting 2, the locking screw 26bb is loosened to allow the elevating pipe 23 to be rotated. That is, the means 26 for holding the elevating pipe 23 can perform the locking and release of the elevating pipe 23 by means of the locking screw 26bb.

The threaded rod 27 is provided at its upper end with a polygonal head so as to permit the threaded rod 27 to be rotated by means of a tool such as a wrench.

The means 28 for holding the threaded rod 27 comprises a bearing housing 28b adapted to receive a bearing 28a for rotatably holding an upper portion of the threaded rod 27, and a supporting frame 28c for supporting the bearing housing 28b, which is coupled at both sides to the upper ends of the guide bars 25.

An operation for mounting the plug 10 in the pipeline fitting 2, which is carried out by the above-constructed plugging machine 20, will be now described.

The adapter 22 is first coupled to the expanding device 14, and then the tapping valve 3 is attached to the fitting 22.

At this point, since the inner edge of the expanding plate 13 is fitted into the annular groove 14c of the expanding device 14, the expanding device 14 is coupled to the plug 10.

Since the screws 11c are loosely screwed on the cylindrical body 11, the expanding plate 13 can be expanded outwardly.

After opening of the tapping valve 3 is completed, the threaded rod 27 is rotated. As the threaded rod 27 is rotated, the elevating pipe 23 and the means 26 for holding the elevating pipe 23 are moved downward by a crewing action between the bushing 23a of the elevating pipe 23 and the threaded rod 27.

Since the plug 10 must be moved to a predetermined position such that the expanding plate 13 of the plug 10 can be expanded to cause its circumferential edge to be fitted into the annular groove 2a of the pipeline fitting 2, the moving distance of the elevating pipe 23 is set beforehand. Measurement of the moving distance can be performed by reading the variance of scale formed at the outer surface of the elevating pipe 23.

After downward movement of the elevating pipe 23 is completed, the locking screw 26bb of the holding means 26 is loosened and the elevating pipe 23 is then rotated by the rotating means 23b. Thereafter, the expanding plate 13 of the plug 10 is expanded outwardly to cause its circumferential edge to be fitted into the annular groove 2a of the pipeline fitting 2.

In this state, the plug 10 cannot be pushed upward even though being subjected to gas pressure in the lower space under the plug 10. Since the inner edge of the expanding plate 13 is drawn from the annular groove 14c of the expanding device 14, the elevating pipe 23 can be raised to cause the expanding device 14 to be separated from the plug 10 and raised.

After the plugging machine 20 and the tapping valve 3 are removed and the screws 11c are securely tightened, the closing plate 5 is sealingly attached to an upper surface of the pipeline fitting 2, as shown in FIG. 4.

Consequently, since the expanding device 14 can be removed from the plug 10 after the plug 10 is mounted in the fitting 2, production costs of the plug 10 can be reduced, and the expanding device 14 can be used as an independent tool for a long period of time.

In addition, since the plug 10, which has been completely mounted in the pipeline fitting 2, is not necessary to have the expanding device 14, the pipeline fitting 2 does not need to be heightened, thereby reducing production costs of the pipeline fitting 2.

When the plug 10 is intended to be removed from the pipeline fitting 2 in order to carry out an operation such as repair of the pipeline 1, the closing plate 5 is first detached from the fitting 2. Thereafter, the screws 11c of the cylindrical body 11 are loosened, and the tapping valve 3 and the plugging machine 20 are then attached to the fitting 2. Subsequently, the plug 10 can be released from the pipeline fitting 2 by carrying out a procedure for mounting the plug in reverse.

As can be seen in the drawings, the plug 10 according to present invention can be applied to various kinds of fittings such as a branch pipeline fitting as well as a fitting for blocking gas flow in a pipeline.

As described above, the present invention provides a plug and a plugging machine for a pipeline fitting which enable an expanding device to be removed even after the plug is mounted in the pipeline fitting and to be used as an independent tool for a long period time, thereby simplifying the structure of the plug and reducing its production costs. Furthermore, since the pipeline fitting can be reduced in height, its production cost can be reduced. In addition, the plug of the present invention can be applied to another pipeline fitting which is used to block gas flow in a pipeline temporarily so as to repair the pipeline.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A plug for a pipeline fitting comprising:

a cylindrical body having at its circumferential surface an annular groove, wherein an upper surface of said cylindrical body is provided with threaded holes to be engaged with by screws, and wherein said cylindrical body is centrally formed at its upper surface with a circular recess;

an O-ring fitted in the annular groove of the cylindrical body;

an expanding plate having a circumferential outer edge to be insertable into an annular groove formed at an inner surface of the pipeline fitting, wherein said expanding plate is divided into a pair of semicircular plates and is provided with a central opening having a minor axis in the direction of expansion of the expanding plate and a major axis in the direction perpendicular to the expansion, and wherein said expanding plate is provided with a plurality of elongated holes corresponding to the screws of the cylindrical body allowing the expanding plate to be coupled to the cylindrical body by the screws, the semicircular plates being provided with pins, wherein the pins are symmetrical to each other with respect to a dividing line of the expanding plate; and an expanding device causing the outer edge of the expanding plate to be inserted into the annular groove of the pipeline fitting, wherein said expanding device comprises a lower disc inserted into the circular recess of the cylindrical body, an upper disc having a pair of curved elongated holes into which the pins of the expanding plate are inserted and which is adapted to move the pins received therein outwardly, an annular groove formed between the upper disc and the lower disc into which inner edges of the semicircular plates of the expanding plate are inserted, and a connecting projection to be connected to a plugging machine.

2. The plug for a pipeline fitting as set forth in claim 1, wherein the cylindrical body is formed at its center with a venting hole, and the lower disc of the expanding device is formed at it lower surface with a plurality of radial venting grooves and is formed at its circumferential surface with a plurality of vertical venting grooves, each of which is connected to an outer end of the corresponding radial venting groove, wherein the cylindrical body is provided at the center of its lower surface with a switching valve device, and wherein the expanding device is provided at the center of its lower surface with a pusher pin for opening the switching valve device.

* * * * *